(12) United States Patent
Harshman et al.

(10) Patent No.: US 6,393,762 B1
(45) Date of Patent: May 28, 2002

(54) PORTABLE BOUQUET HOLDER

(75) Inventors: Trent A. Harshman, Galveston, IN (US); Mary M. Schneider, Cincinnati, OH (US)

(73) Assignee: Syndicate Sales, Inc., Kokomo, IN (US)

( * ) Notice: Subject to any disclaimer, the term of this patent is extended or adjusted under 35 U.S.C. 154(b) by 0 days.

(21) Appl. No.: 09/464,496

(22) Filed: Dec. 15, 1999

(51) Int. Cl.[7] .................................................. A01G 5/00
(52) U.S. Cl. ..................................................... 47/41.12
(58) Field of Search ........................... 47/41.01, 41.11, 47/41.12, 41.13, 41.14, 41.15; 428/530, 23, 17

(56) References Cited

U.S. PATENT DOCUMENTS

| 427,402 | A | | 5/1890 | Christie |
|---|---|---|---|---|
| 1,462,947 | A | | 7/1923 | Stuck |
| 1,562,992 | A | | 11/1925 | Schling |
| 1,629,112 | A | | 5/1927 | MacDonald |
| 2,005,467 | A | | 6/1935 | Menge |
| 2,381,253 | A | | 8/1945 | Bierwert |
| 2,700,848 | A | | 2/1955 | Reynolds |
| 3,447,262 | A | | 6/1969 | Uhl |
| D215,320 | S | * | 9/1969 | Klayman ..................... D35/1 |
| 3,767,104 | A | | 10/1973 | Bachman et al. |
| 4,065,016 | A | * | 12/1977 | Perkins .......................... 215/6 |
| 4,937,109 | A | | 6/1990 | Lin |
| 5,070,644 | A | * | 12/1991 | Hasty ........................ 47/41.12 |
| 5,279,072 | A | * | 1/1994 | Garbo ........................ 47/41.14 |
| 5,454,189 | A | * | 10/1995 | Graham et al. ............. 47/41.12 |
| 5,630,291 | A | * | 5/1997 | Fontana ..................... 47/41.01 |
| 5,787,638 | A | * | 8/1998 | Harshman .................. 47/41.12 |

FOREIGN PATENT DOCUMENTS

| DE | 2 261 148 | | 6/1974 |
|---|---|---|---|
| DE | 26 48 962 A1 | | 5/1978 |
| GB | 1151128 | * | 11/1967 |
| GB | 2 147 205 A | | 9/1983 |

* cited by examiner

Primary Examiner—Charles T. Jordan
Assistant Examiner—Jordan Lofdahl
(74) Attorney, Agent, or Firm—Woodard, Emhardt, Naughton Moriarty & McNett (57) ABSTRACT

A portable bouquet holder comprises a head including a cup and a rim. The cup has an upper edge defining an opening and further has one or more apertures. The rim is adjoined to the upper edge of the cup. The portable bouquet holder further comprises a peg including a shank having one or more holes extending therethrough. The shank is adjoined to the cup. The peg further includes one or more walls adjoined to and extended from the shank. The walls are spaced on the shank to facilitate access to the holes of the shank. The portable bouquet holder optionally comprises a block of foam partially disposed within the opening of the cup.

1 Claim, 7 Drawing Sheets

PORTABLE BOUQUET HOLDER

BACKGROUND OF THE INVENTION

1. Field of the Invention

The present invention generally relates to bouquet holders, and specifically relates to a portable bouquet holder that may either be held in a hand for special occasions like a wedding or inserted into container like a vase to florally display a bouquet of flowers.

2. Background

Portable bouquet holders are known in the art. Typically, such portable bouquet holders comprise hand-held containers having water therein. For example, U.S. Pat. No. 3,651,601 discloses a portable bouquet holder comprising a water-filled bowl having a downwardly extending stem that is either held in a hand of a user of the portable bouquet holder or inserted into a base to florally display a bouquet of flowers. For relatively large floral arrangements, containers like the bowl of U.S. Pat. No. 3,651,601 must be sufficiently dimensioned to hold a sufficient amount of water therein. Consequently, problems associated with these prior portable bouquet holders when they are hand-held include the distraction of having to continually balance the container to prevent water from spilling out of the container, or the inconvenience of pouring the water out of the container prior to holding the container. What is therefore needed is a portable bouquet holder that permits a floral arrangement mounted thereto to receive water from an outside source.

SUMMARY OF THE INVENTION

The present invention provides a new and unique portable bouquet holder. The portable bouquet holder overcomes the aforementioned drawbacks associated with prior portable bouquet holder having a container filled with water. Various aspect of the present inventions are novel, non-obvious, and provide various advantages. While the actual nature of the present invention described in detail herein can only be determined with reference to the claims appended hereto, certain features which are characteristic of the present invention disclosed herein can be described briefly.

As shown in the following description of the various embodiments of the present invention, a portable bouquet holder comprises a head including a container having one or more apertures. The portable bouquet holder comprises a peg adjoined to the head. The peg includes one or more holes extending therethrough. The portable bouquet holder optionally comprises a block of foam mounted to head 20.

It is a primary objective of the present invention to provide a portable bouquet holder having a floral arrangement with relatively long stems uniformly affixed or detachably coupled thereon.

It is another primary objective of the present invention to provide a portable bouquet holder that facilitates water absorption by a floral arrangement mounted thereon when the portable bouquet holder is mounted to a container like a vase.

Secondary objectives as well as advantages of the present invention will be apparent from the following description of the present invention and various embodiments thereof.

DESCRIPTION OF THE PREFERRED EMBODIMENT

For the purposes of promoting an understanding of the principles of the present invention, reference will now be made to the preferred and alternative embodiments of the present invention as illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated herein are contemplated as would normally occur to one skilled in the art to which the present invention relates.

Figure 1:
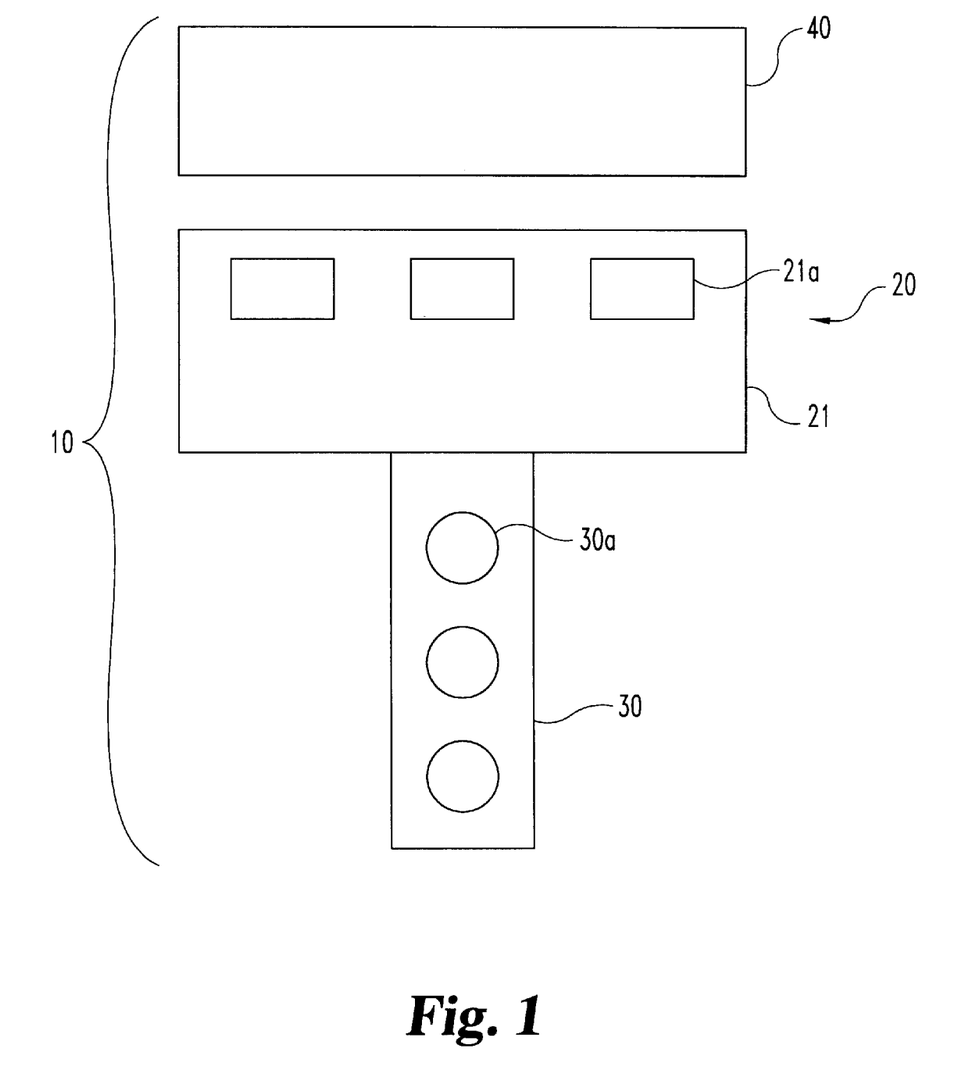
FIG. 1 is an exploded view of a block diagram of a portable bouquet holder of the present invention.

The present invention is a portable bouquet holder 10 as shown in FIG. 1. For purposes of the present invention, the term adjoined is defined as an unitary fabrication, an affixation, or a detachable coupling by any method of two or more components of an embodiment of portable bouquet holder 10. Referring to FIG. 1, each embodiment of portable bouquet holder 10 comprises a head 20 including at least a container 21 having one or more apertures 21a, e.g. three (3) apertures 21a as shown. The present invention contemplates that container 21 can have any geometric configuration and any dimensions, and that container 21 can be made from any suitable material. The present invention further contemplates that aperture(s) 21a can have any geometric configuration and any dimensions, and that aperture(s) 21a can be located on any side surface of container 21. Consequently, any illustration of a preferred embodiment of head 20 and of container 21 herein as well as an accompanying description is given solely for purposes of describing the best mode of the present invention and is not to be limiting in any way.

Each embodiment of portable bouquet holder 10 further comprises a peg 30 with one or more holes 30a extending therethrough, e.g. three (3) holes 30a as shown. The present invention contemplates that peg 30 can have any geometric configuration and any dimensions, and that peg 30 can be made from any suitable material. The present invention further contemplates that hole(s) 30a can have any geometric configuration and any dimensions, and that hole(s) 30a can be located anywhere on peg 30. Peg 30 is adjoined to head 20 for each embodiment of portable bouquet holder 10, and the present invention contemplates that any portion of peg 30 can be adjoined to any portion of head 20, e.g. peg 30 can be adjoined to bottomside surface of container 21. Consequently, any illustration of a preferred embodiment of peg 30 herein as well as an accompanying description is given solely for purposes of describing the best mode of the present invention and is not to be limiting in any way.

An embodiment of portable bouquet holder 10 optionally comprises a block of foam 40 to be affixed to head 20 by any method whereby a plurality of flower stems may be selectively inserted into foam 40 to thereby define a desired floral arrangement mounted onto head 20. It is to be appreciated that a flower stem selectively inserted through foam 40 can further be sequentially inserted through an opening of a container 21 and an aperture 21a, and extended adjacent peg 30 whereby the flower stem can be affixed or detachably coupled to peg 30 by a piece of wire, or the like that has a portion extending through one of holes 30a. The present invention contemplates that foam 40 can have any geometric configuration and any dimensions, and that foam 40 is made from suitable material. Consequently, any illustration of a preferred embodiment of foam 40 herein as well as an accompanying description is given solely for purposes of describing the best mode of the present invention and is not to be limiting in any way.

Referring to FIGS. 2A–6, a portable bouquet holder 110 as a preferred embodiment of portable bouquet holder 10 (FIG. 1) is shown. Portable bouquet holder 110 comprises a head 120 as a preferred embodiment of head 20 (FIG. 1). Head 120 includes a cup 121, and a rim 122. Cup 121 has a conically shaped configuration upwardly extending from a lower edge 121b to an upper edge 121a that defines an opening therein. Cup 121 includes at least one aperture 121c, preferably ten (10) apertures 121c serially disposed adjacent upper edge 121a as shown. It is also preferred that cup 121 is made from a plastic. Rim 122 has an annular configuration, and is adjoined to (preferably unitarily fabricated with) upper edge 121a of cup 121 whereby the hole of rim 122 is aligned with the opening of cup 121. The diameter of upper edge 121a is less than an outside diameter of rim 122 whereby a side surface of cup 121 or rim 122 can be removably mounted onto an opening of a container like a vase.

Figure 2A:
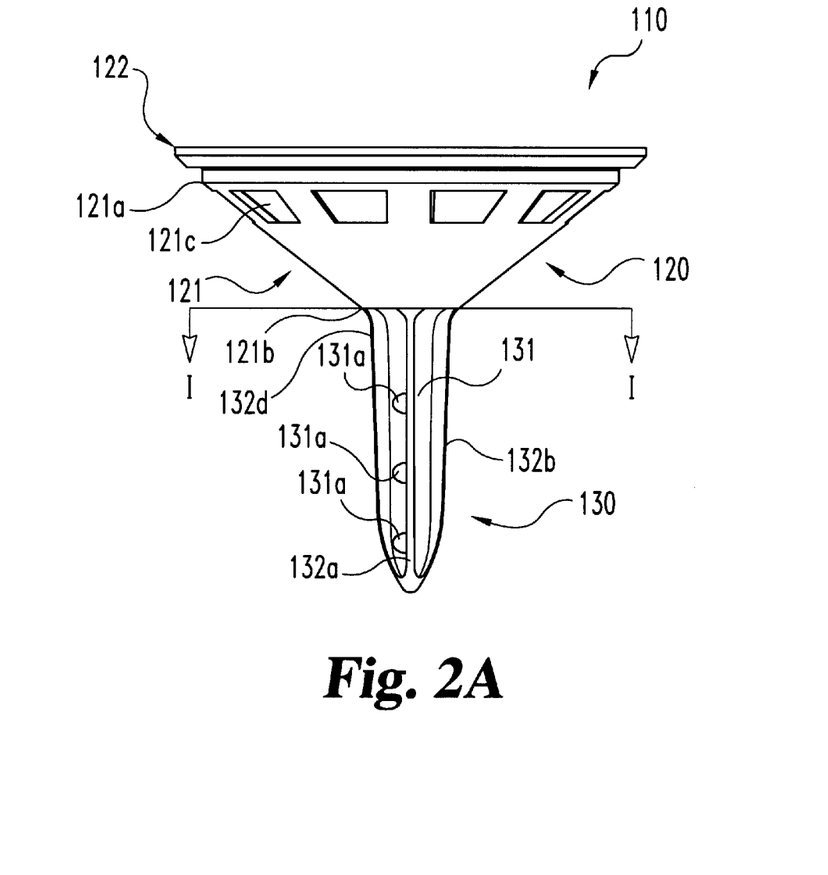
FIG. 2A is a first side view of a preferred embodiment of a portable bouquet holder in accordance with the present invention.
Figure 2B:
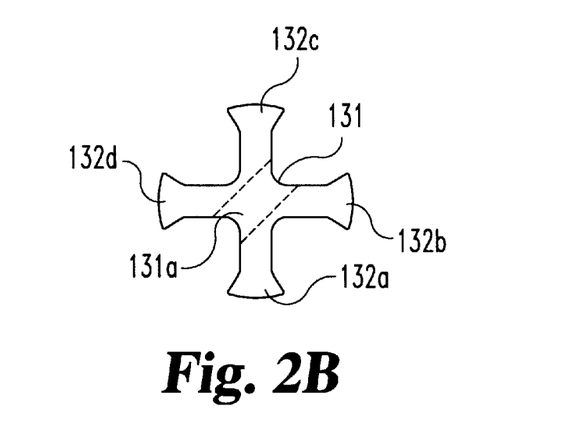
FIG. 2B is a cross-sectional view of the portable bouquet holder of FIG. 2A taken along line I—I.
Figure 3A:
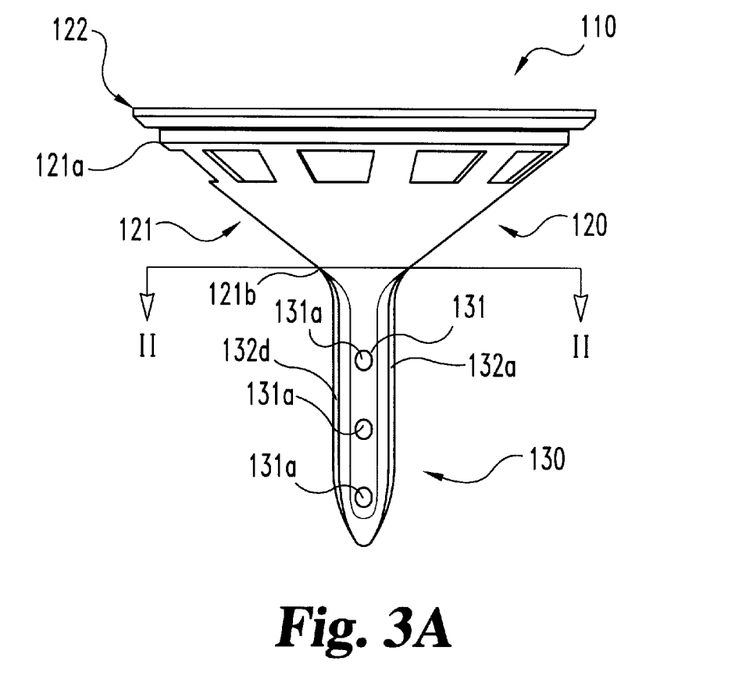
FIG. 3A is a second side view of the portable bouquet holder of FIG. 2A rotated forty-five (45) degrees to the right.
Figure 3B:
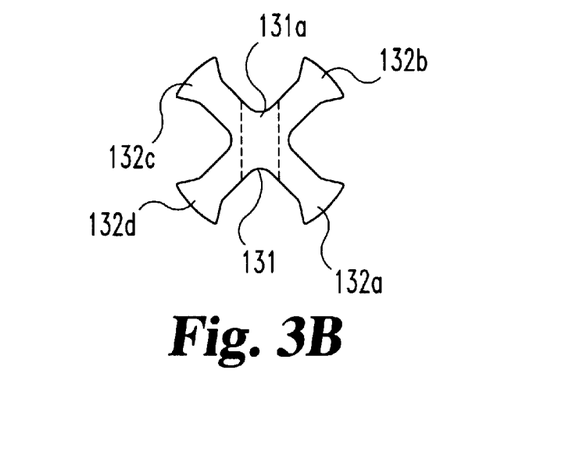
FIG. 3B is a cross-sectional view of the portable bouquet holder of FIG. 3A taken along line II—II.
Figure 4A:
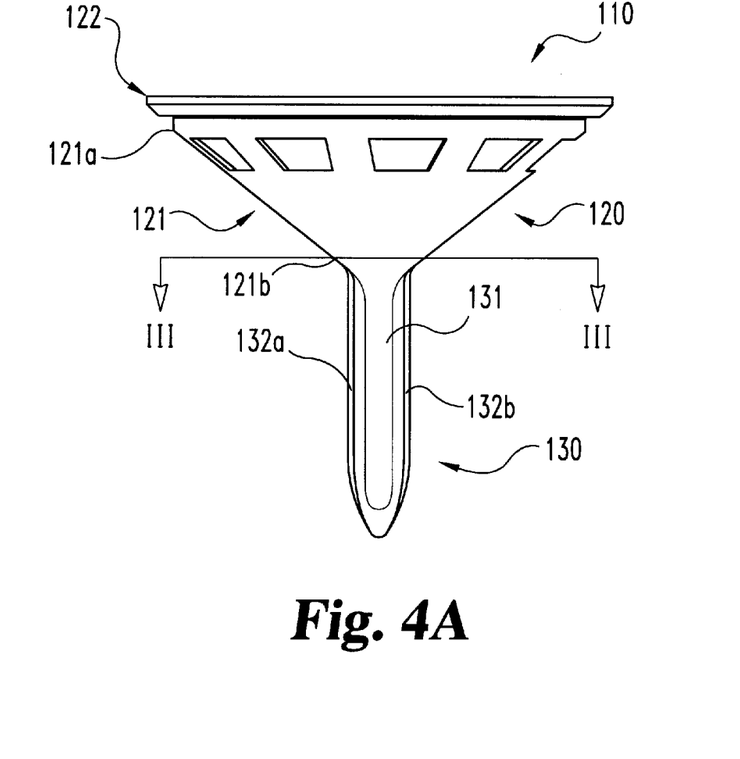
FIG. 4A is a third side view of the portable bouquet holder of FIG. 2A rotated forty-five degree to the left.
Figure 4B:
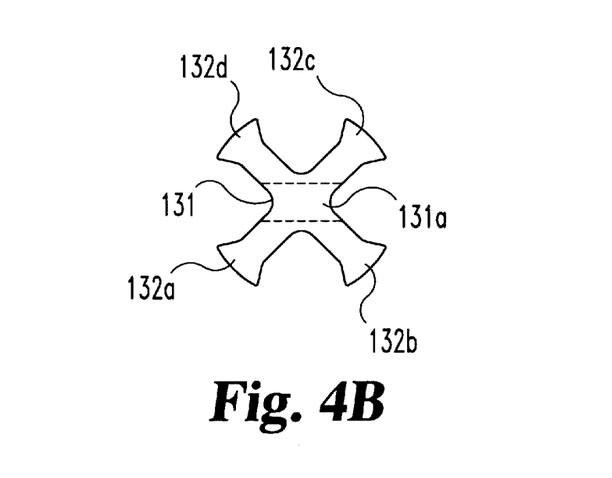
FIG. 4B is a cross-sectional view of the portable bouquet holder of FIG. 4A taken along line III—III.
Figure 5:
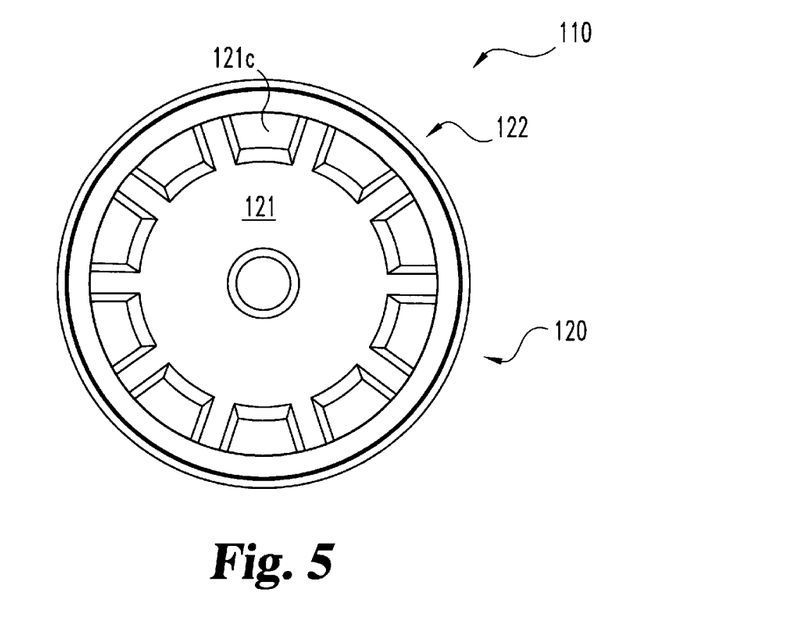
FIG. 5 is a top view of the portable bouquet holder of FIG. 2A.
Figure 6:
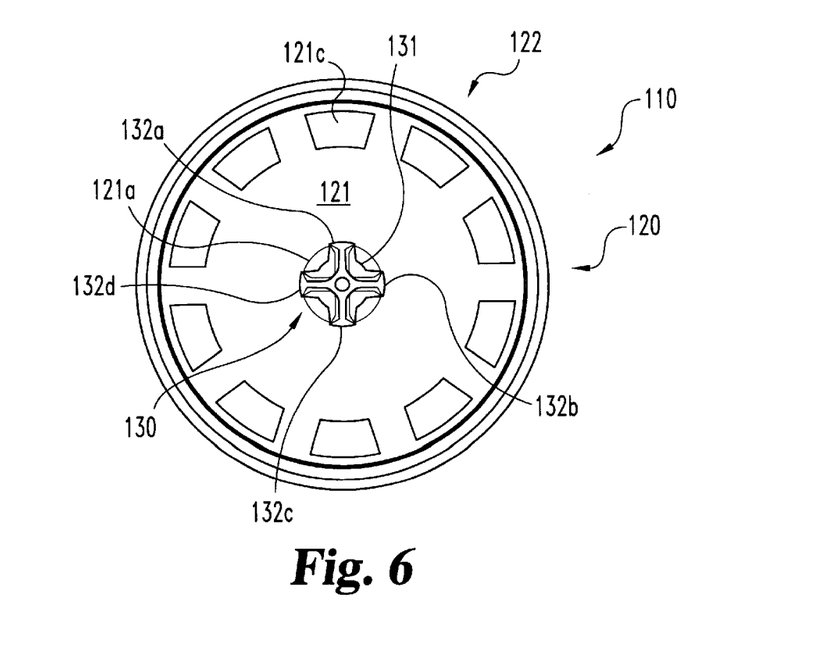
FIG. 6 is a bottom view of the portable bouquet holder of FIG. 2A.

Portable bouquet holder 110 further comprises a peg 130 as a preferred embodiment of peg 30 (FIG. 1). Peg 130 includes a shank 131 having a cylindrical configuration as best shown in FIGS. 2B, 3B, and 4B. A topside surface of shank 131 is adjoined to (preferably unitarily fabricated with) a bottomside surface of cup 121. Shank 131 has a rounded bottomside surface to thereby facilitate an insertion of shank 131 into dirt, soil, foam, etc. Shank 131 has one or more holes 131a extended therethrough, e.g. three (3) holes 131a as shown. Holes 131a are perpendicularly aligned along a longitudinal axis of shank 131. Peg 130 optionally includes a wall 132a, a wall 132b, a wall 132c, and/or a wall 132d. Walls 132a–d each have one side surface adjoined to (preferably unitarily fabricated with) shank 131 to thereby constitute a four sided cross section as best shown in FIGS. 2B, 3B, and 4B. Walls 132a–d are parallelly aligned with the longitudinal axis of shank 131, and adjoined to along shank 131 at ninety (90) degrees intervals whereby one opening of each of holes 131a is disposed between wall 132a and wall 132d and the other opening of each of holes 131a is disposed between wall 132b and wall 132c as best shown in FIGS. 2B, 3A, 3B, 4B.

Figure 7:
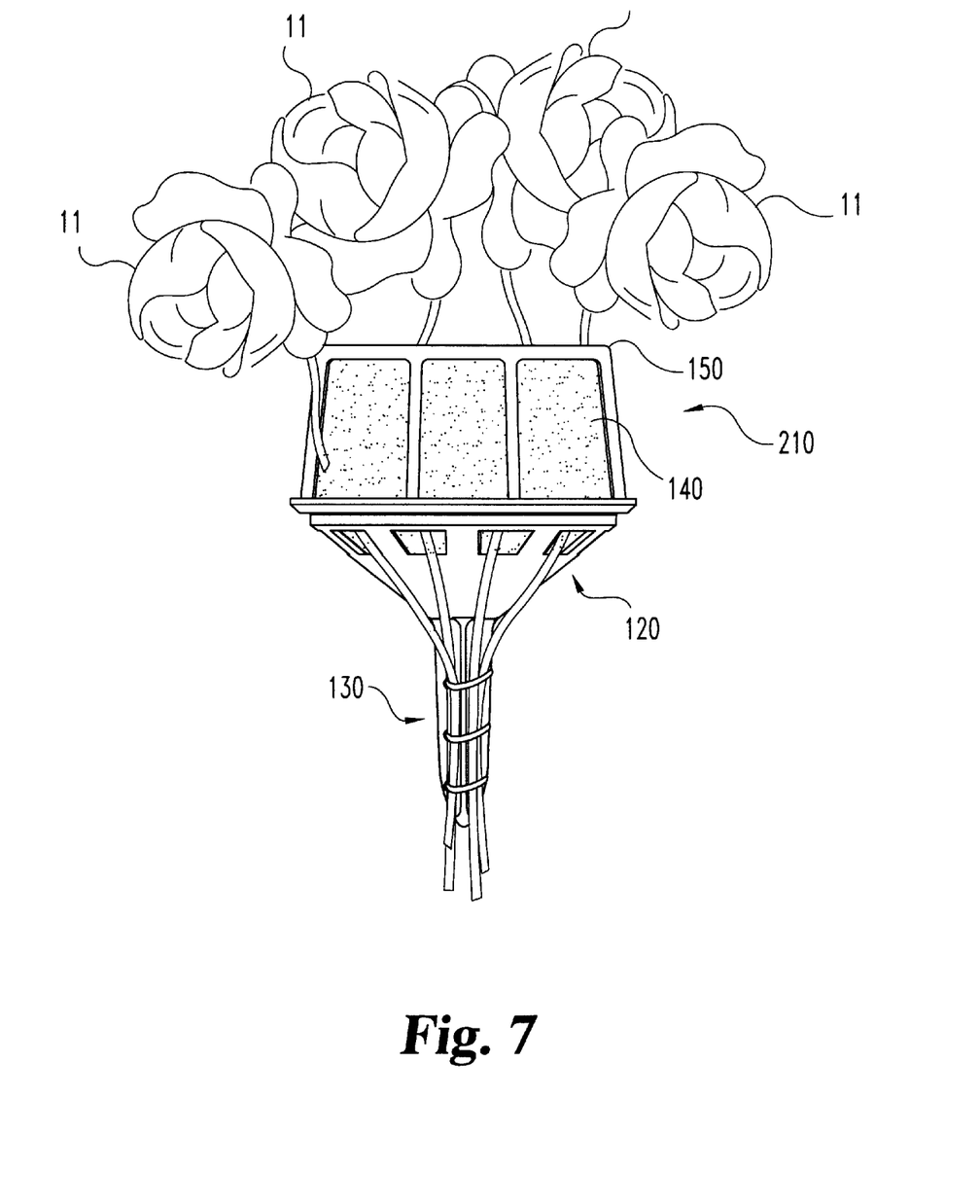
FIG. 7 is a side view of a second embodiment of a portable bouquet holder in accordance with the present invention.

Referring to FIG. 7, a portable bouquet holder 210 as an alternative embodiment of portable bouquet holder 10 (FIG. 1) is shown. Portable bouquet holder 210 comprises head 120 and peg 130 as previously described herein in connection with FIGS. 2–6. Portable bouquet holder 210 further comprises a water retaining or dry foam 140 having a cylindrical configuration as a preferred embodiment of foam 40 (FIG. 1), and a cage 150 having a cylindrical configuration. Foam 140 is disposed within a bottom opening (not shown) of cage 150, and a lower edge (not shown) of cage 150 is adjoined to (preferably affixed to) rim 122. Foam 140 is dimensioned to extend through the bottom opening of cage 150 into cup 121 below apertures 121c.

An example of a floral arrangement mounted on head 120 of portable bouquet holder 210 and having relatively long stems uniformly and detachably coupled to peg 130 of portable bouquet holder 210 will now be described. Stems of flowers 11 are sequentially inserted through a topside of foam 140, and one of the apertures 121c of cup 121 with a distal end of the stems being adjacently extended to peg 130. Three (3) pieces of wire have portions extended through holes 131a, respectively, and are thereby utilized to detachably couple the stems to peg 130 whereby flowers 11 are also uniformly coupled to peg 130. For flowers having longer stems, it is to be appreciate that a middle portion of such stems are adjacent peg 130 when the stems are affixed or detachably coupled thereto.

Figure 8:
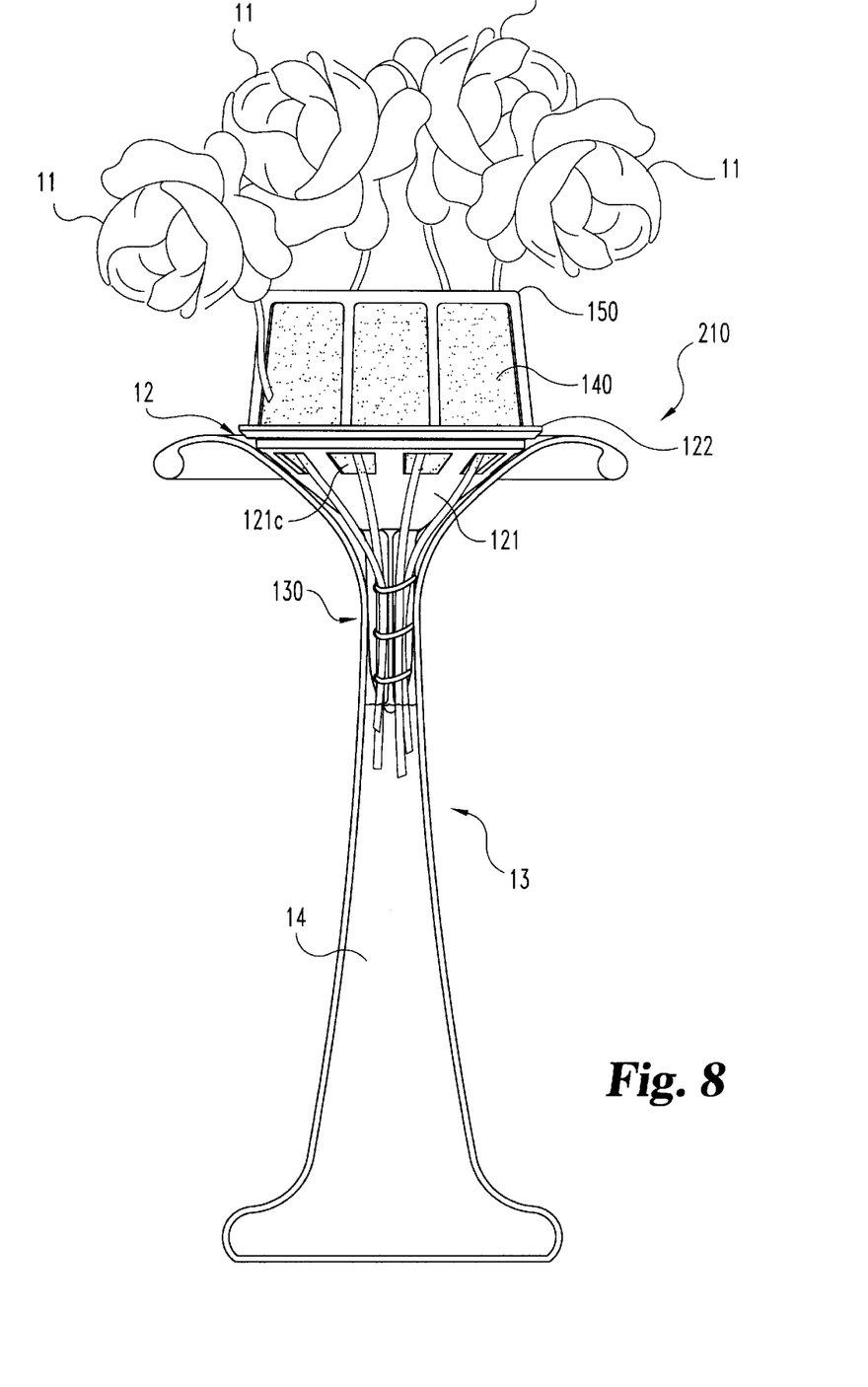
FIG. 8 is a side view of the portable bouquet holder of FIG. 7 removably mounted onto a vase.

Referring to FIG. 8, an example of a removable mounting of head 120 of portable bouquet holder 210 (FIG. 7) onto a vase 13 is shown. Peg 130 and cup 121 are inserted through an opening 12 of vase 13 whereby the stems of flowers 11 are spaced from vase 13 to thereby prevent any physical damage to the stems of flowers 11. Rim 122 is then disposed upon the opening of vase 13 to thereby removably mount head 120 thereupon. It is to be appreciated that a body of water 14 can poured into vase 13 at a level that reaches the stems of flowers mounted onto head 120 to thereby facilitate water absorption by the stems of flowers 11, e.g. a level that is higher than the bottomside surface of peg 130 as shown.

While the present invention has been illustrated and described in detail in the drawings and foregoing description, the same is to be considered as illustrative and not restrictive in character, it being understood that the preferred embodiments have been shown and described and that all changes and modifications that come within the spirit of the invention are desired to be protected.

What is claimed is:

1. A bouquet holder comprising:
   a flower having a stem;
   a vase for holding water and having an upwardly facing opening to receive said stem;

a portable bouquet holder including:

a foam body;

a holder having said foam body mounted thereon, said holder having a plurality of downwardly facing apertures with said stem extending through said foam and then through one of said apertures;

an elongated peg connected to and beneath said holder, said peg sized to fit into said vase with said stem extending from said one of said apertures to alongside said peg and into said vase, said peg including a stem fastening hole; and, means extending through said hole and around said stem holding said stem extending alongside to said peg; and wherein:

said vase includes a top edge portion surrounding said opening, and said holder includes a rim surrounding said foam sized to fit and rest atop said top edge portion supporting said portable bouquet holder relative to said vase to locate said peg and said stem in said vase; and, said peg includes a shank with a longitudinal axis and four walls that extend outwardly therefrom, said four walls are parallel with and extend along said longitudinal axis of said shank, said four walls are connected to said shank and are spaced around said axis at 90 degree intervals forming recesses extending along said axis with said stem extending in one of said recesses, said hole extends through said shank and has opposite opening ends located between said walls.

* * * * *